(12) United States Patent
Hill et al.

(10) Patent No.: US 9,776,667 B2
(45) Date of Patent: Oct. 3, 2017

(54) TRAILER MOVING SYSTEM

(71) Applicants: Malcolm Hill, Melbourne (AU); Stuart Barrow, Cambridge (GB); Matthew Rowley, Durham (GB); Jeremiah Fashe, Ipswich (GB); Yemi Ajibade, Ipswich (GB)

(72) Inventors: Malcolm Hill, Melbourne (AU); Stuart Barrow, Cambridge (GB); Matthew Rowley, Durham (GB); Jeremiah Fashe, Ipswich (GB); Yemi Ajibade, Ipswich (GB)

(*) Notice: Subject to any disclaimer, the term of this patent is extended or adjusted under 35 U.S.C. 154(b) by 32 days.

(21) Appl. No.: 14/839,251

(22) Filed: Aug. 28, 2015

(65) Prior Publication Data

US 2016/0059650 A1   Mar. 3, 2016

(51) Int. Cl.
*B62D 21/20*   (2006.01)
*B62D 59/04*   (2006.01)

(52) U.S. Cl.
CPC ............. *B62D 21/20* (2013.01); *B62D 59/04* (2013.01)

(58) Field of Classification Search
CPC ................................ B62D 21/20; B62D 59/04
USPC ......................................................... 280/789
See application file for complete search history.

(56) References Cited

U.S. PATENT DOCUMENTS

| | | | | |
|---|---|---|---|---|
| 3,356,386 A * | 12/1967 | Taylor | ...................... | B60G 3/14 267/248 |
| 3,891,231 A * | 6/1975 | Snoberger | .............. | B60G 11/04 267/271 |
| 5,380,028 A * | 1/1995 | Ferris | ...................... | B60G 11/20 267/242 |
| 9,096,105 B1 * | 8/2015 | Spiller | ..................... | B60D 1/50 |
| 2015/0298519 A1 * | 10/2015 | Iliuta | ...................... | B60P 1/027 280/6.151 |

* cited by examiner

*Primary Examiner* — Faye M Fleming
(74) *Attorney, Agent, or Firm* — Purple Line LLC (57) ABSTRACT

A system for supporting a trailer mover in a fixed spatial relationship to the wheels of a trailer is provided. The system has embodiments handling both independent and non-independent suspension; movers mounted either before or aft the wheels; and, movers mounted on either left hand or right hand wheels. The system attaches to the sprung portion of the trailer suspension to provide the fixed spatial relationship. Adjustable components provide longitudinal and lateral adjustment of the position of the trailer mover to cater for different proximal wheel and suspension geometries.

15 Claims, 12 Drawing Sheets

TRAILER MOVING SYSTEM

CROSS-REFERENCE TO RELATED APPLICATION

This application claims the benefit of priority of Australian patent application number 2014218438, filed 29 Aug. 2014, the contents of which are herein incorporated by reference.

FIELD OF THE INVENTION

The present invention relates to a system for moving trailers without a vehicle. It is particularly suited for moving caravans and will be described in such a context, but is not to be limited to use with caravans as it is readily applicable to other types of trailers.

BACKGROUND TO THE INVENTION

It is often desirable to move trailers without the use of a vehicle, such as when storing a trailer or maneuvering the trailer into a confined space. This is easy to do manually when the trailer is small and unladen, but is burdensome for a large heavy trailer such as a caravan. This is particularly so for elderly caravan enthusiasts who form a high proportion of caravan users.

Caravan movers have been developed which consist of an electric motor which drives a roller. The mover is attached to the chassis of the caravan and when being used, moved into position such that the roller engages a wheel of the caravan and is thus able to provide motive force to the caravan to propel it short distances. For larger caravans it is common to fit a mover to both a left hand and a right hand wheel of the caravan. When not in use the mover is disengaged from the wheel and in some instances removed from the caravan. A mover will typically include a mechanism to easily engage and disengage the wheel, typically operated by a lever or a jack handle.

Known caravan movers are effective in most situations, however as the movers are fixed to the chassis of the caravan and the wheels of a caravan are mounted via a suspension system, the mover and the wheels can move independently of each other.

The mover may unexpectedly disengage from a wheel when there is a large movement in the suspension. Moving a caravan over a kerb or a pot-hole is often sufficient to disengage a mover from a wheel. If such disengagement is transitory the caravan may move in an uncontrolled and dangerous manner. If the disengagement is permanent the user would need to adjust the mover into position again to continue moving the caravan.

A large movement in the suspension may also bring the mover closer to the wheel. If this movement is excessive, undue force is applied to the mover which may permanently damage the mover.

The object of this invention is to provide a trailer mover that operates in a fixed relation to the wheels of a trailer to alleviate the above problems, or at least provides the public with a useful alternative.

SUMMARY OF THE INVENTION

In a first aspect the invention comprises a support assembly for holding a trailer mover in a fixed spatial relationship with a wheel of a trailer, said trailer including suspension with sprung components, wherein the support assembly is attached to the sprung components of the suspension. Sprung component may include the axle carrier of a motor vehicle, including the axle supporting the wheels, a spring support plate of an independent suspension, a frame of an independent suspension, components of a motor vehicle that carry a suspension system, or the like. The suspension or suspension system may include at least one suspension spring. The at least one suspension spring may include but not limited to leaf springs, coil springs, suspension variants with shocks or rubber indespension units and the like.

Preferably the support assembly comprises a first member to provide longitudinal displacement of the trailer mover relative to the wheel, and a second member to provide lateral displacement of the trailer mover relative to the wheel.

Preferably the first member is adjustable to vary the longitudinal displacement of the trailer mover relative to the wheel and the second member is adjustable to vary the lateral displacement of the trailer mover relative to the wheel.

The suspension may include an axle, and the support assembly is attached to the axle.

The suspension may be and independent suspension including a spring support plate with the support assembly attached to the spring support plate, or the suspension may include a frame with the support assembly attached to the frame.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

The various elements of the drawings are identified as follows:

LIST OF COMPONENTS

| | |
|---|---|
| 20 | chassis with non-independent suspension |
| 21 | chassis frame |
| 22 | front axle |
| 23 | rear axle |
| 30, 32, 34, 36 | wheels |
| 40 | (left rear) trailer mover fixed support assembly |
| 41 | trailer mover |
| 42, 44 | longitudinal member |
| 43, 45 | axle attachment bracket |
| 46, 48 | longitudinal extension |
| 47, 49 | transverse attachment bracket |
| 50 | transverse member |
| 51 | mover support bracket |
| 54 | mover mount |
| 55, 56 | longitudinal locks |
| 58 | longitudinal adjustment |
| 59 | transverse adjustment |
| 60 | (right rear) trailer mover support assembly |
| 61 | trailer mover |
| 70 | (left front) trailer mover support assembly |
| 71 | trailer mover |
| 80 | (right front) trailer mover support assembly |
| 81 | trailer mover |
| 120 | chassis with independent suspension |
| 121 | chassis frame |
| 130, 132, 134, 136 | wheels |
| 140 | (left rear) trailer mover independent support assembly |
| 141 | trailer mover |
| 142 | fixed longitudinal bracket |
| 143 | sliding longitudinal bracket |
| 144, 145 | longitudinal adjustment slots |
| 146 | transverse locks |
| 150 | transverse guide |
| 151 | mover support bracket |
| 153 | transverse member |
| 154 | mover attachment |
| 158 | longitudinal adjustment |
| 159 | transverse adjustment |
| 160 | rear left suspension unit |
| 161, 162 | suspension mounts |
| 163, 164 | suspension arms |
| 166 | spring support |
| 167 | spring |
| 168 | axle support\ |
| 180 | (right rear) trailer mover independent support assembly |
| 181 | trailer mover |
| 190 | rear right suspension unit |
| 210 | front left suspension unit |
| 240 | (left front) trailer mover independent support assembly |
| 241 | trailer mover |
| 260 | front right suspension |
| 263 | outer suspension arm |
| 265 | cross member |

-continued

LIST OF COMPONENTS

| | |
|---|---|
| 280 | (right front) trailer mover independent support assembly |
| 281 | trailer mover |
| 282 | inner mounting bracket |
| 283 | outer mounting bracket |
| 284 | mover support |
| 286, 287 | transverse locks |
| 290 | first inner sub-bracket |
| 291 | second inner sub-bracket |
| 292 | adjustment slots |
| 293 | bracket apertures |
| 295 | first outer sub-bracket |
| 296 | second outer sub-bracket |
| 297 | adjustment slots |
| 298 | longitudinal adjustment |
| 299 | transverse adjustment |

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides a means of supporting a trailer mover in a fixed relationship to the wheels of a trailer. This ensures that the mover stays in contact with the wheel as the suspension of the trailer moves as will happen as the trailer wheels encounter a bump or a ditch. Trailer movers can be mounted both fore and aft of wheels and the trailers may have independent or non-independent suspensions. Such variations have necessitated multiple embodiment of the invention, all of which maintain a trailer mover in a fixed relationship to a wheel. The invention will be described first for non-independent suspension; then for independent suspension where the trailer mover is mounted aft of the wheels; and finally for independent suspension where the trailer mover is mounted before the wheels. Further embodiments of the invention cater for differences between left hand and right hand wheels; however as these embodiments are merely mirror images of other embodiments they will not be discussed in any detail.

Figure 1:
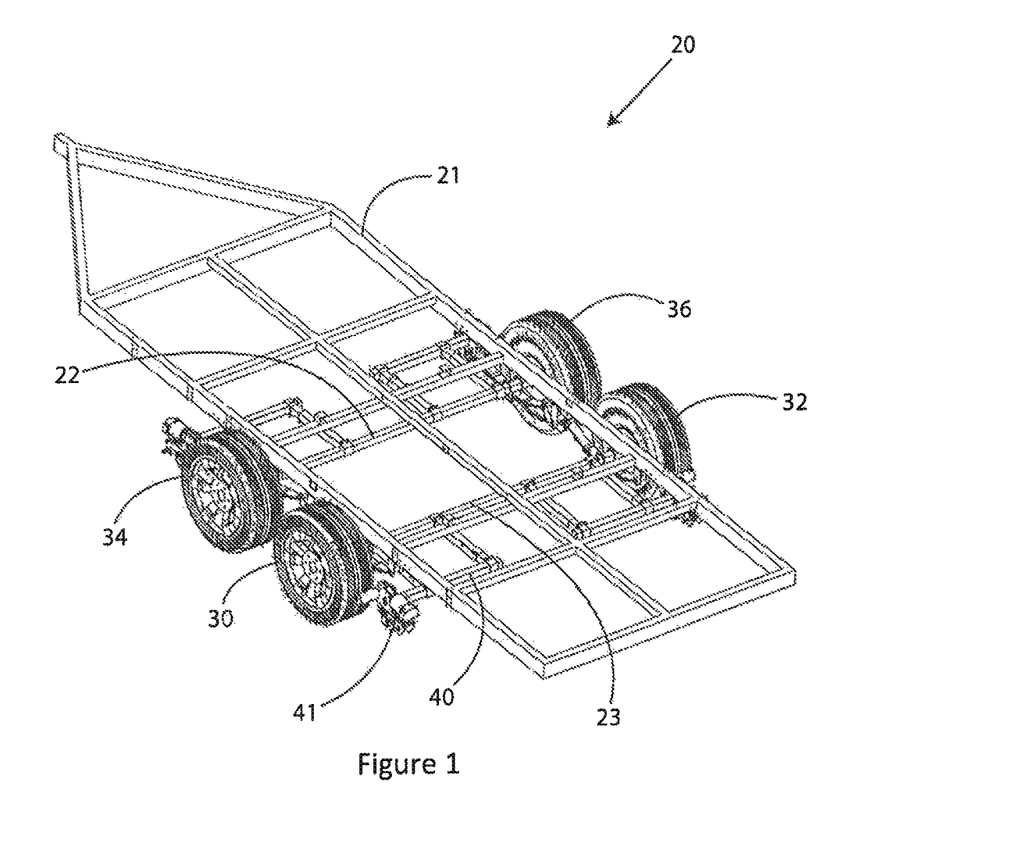
FIG. 1 shows the chassis of a trailer with non-independent suspension fitted with four instances of the trailer moving system according to a first embodiment of the present invention.

A trailer chassis with non-independent suspension 20 is shown in FIG. 1 fitted with a first embodiment 40 of the invention supporting trailer mover 41 in fixed relation to the rear left hand wheel 30. The chassis 20 comprises a frame 21 on which front axle 22 and rear axle 23 are mounted via leaf springs.

Figure 2:
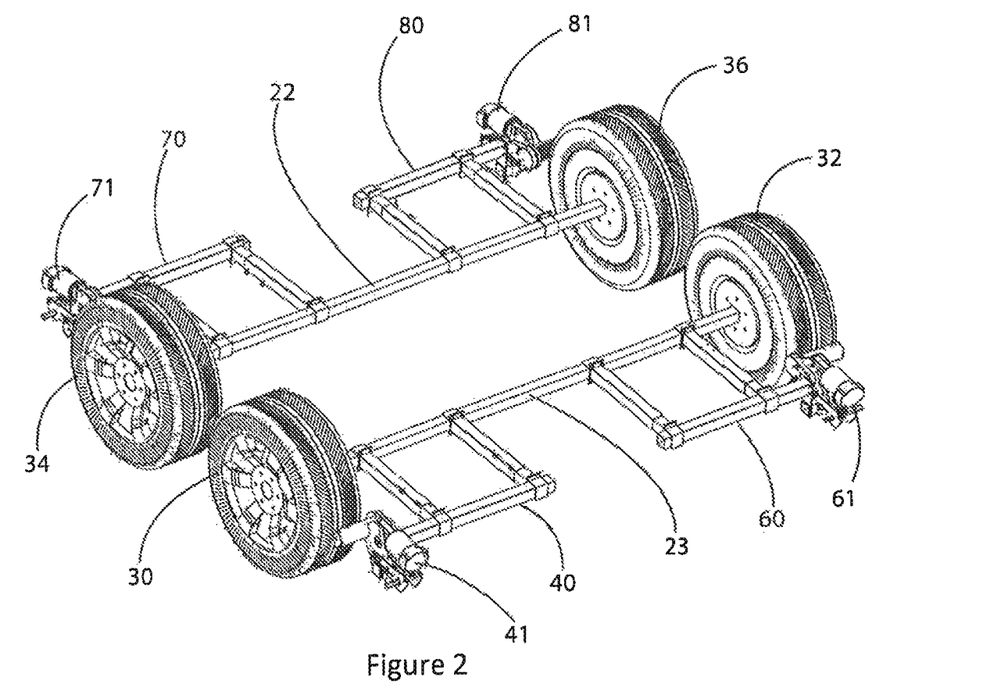
FIG. 2 is a view of the invention as per FIG. 1 with the chassis removed to better illustrate the invention.

In FIG. 2 the chassis frame and springs are hidden to reveal the invention and its attachment to the axles. The support assembly 40 is attached to the rear axle 23 and holds mover 41 in relationship with a proximal wheel-the rear left hand wheel 30 in FIG. 2. It should be understood that when using the term "support assembly" in any of its embodiments, that the same term may be understood to be a "support member." It should also be understood that the components of the support assembly/support member that provide the longitudinal displacement or positioning may be referred to as a "first member" or portion thereof. Similarly, all the components that provide lateral displacement or positioning may be referred to as "second member" or a portion thereof. Also on the rear axle is a further embodiment of the support assembly 60 holding mover 61 in relationship with the rear right hand wheel 32. The support assembly 60 is simply a mirror image of the support assembly 40. The arrangement on the rear axle is mirrored on the front axle 22, with and support assembly 70 holding mover 71 in relationship with the front left hand wheel 34, and support assembly 80 holding mover 81 in relationship with the front right hand wheel 36.

Figure 3A:
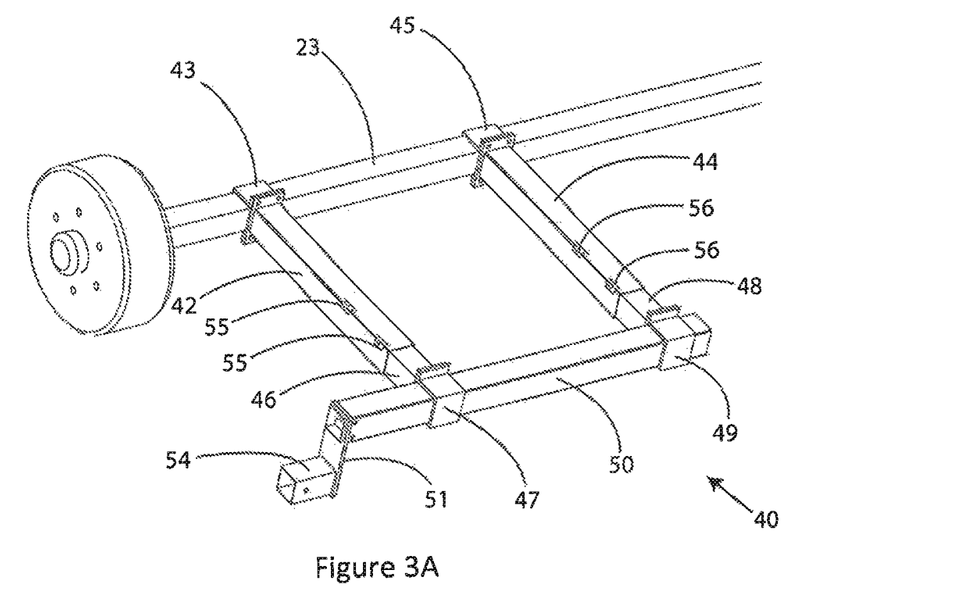
FIG. 3A is a close up view of rear left hand instance of a trailer mover support assembly of the invention according to a first embodiment of the invention shown in a first position.

An isolated view of the support assembly 40 can be seen in FIGS. 3A in which the mover 41 and the wheel have 30 have also been removed. The support assembly 40 may include longitudinal members 42 and 44 which are connected to the rear axle 23 by axle attachment brackets 43 and 45. Longitudinal extensions 46 and 48 telescopically engage the longitudinal members to provide longitudinal adjustment of the transverse member 50, also known. The extensions are locked in place by longitudinal locks 55, 56 which comprise a threaded body that allows a screw to pass through to engage the extensions. Grub screws may alternatively be used. The brackets 47 and 49 attaching the transverse member may be loosened to allow for transverse adjustment. A mover support bracket 51 is attached to the end of the transverse member and provides a mount 54 for engaging the trailer mover 41.

Figure 3B:
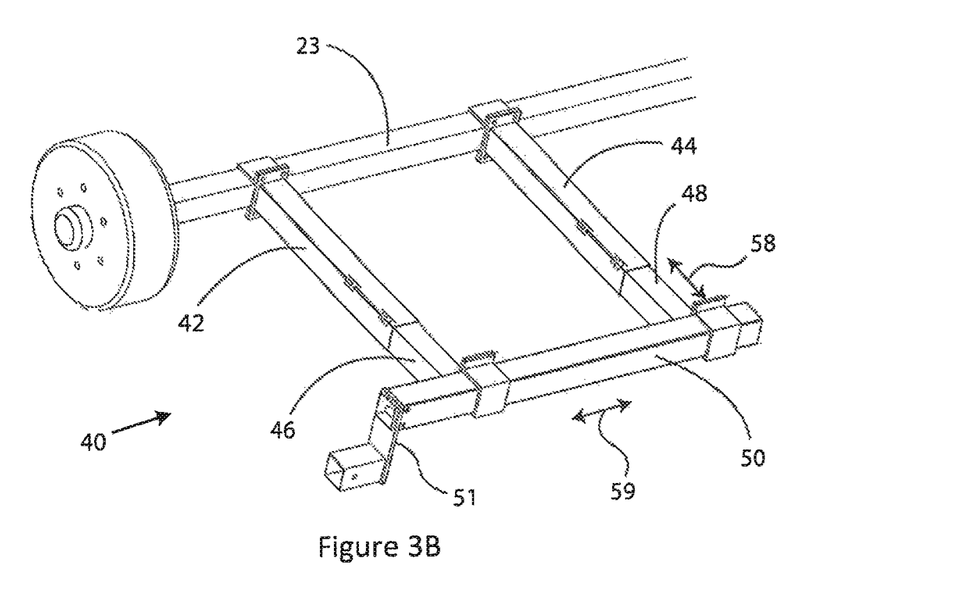
FIG. 3B shows the trailer mover support assembly of FIG. 3B in a second position.

FIG. 3B demonstrates the adjustment of the support assembly 40 with respect to FIG. 3A with the longitudinal adjustment being indicated by arrow 58 and the lateral adjustment by arrow 59. The longitudinal extensions 46, 48 have been extended relative to FIG. 3A and the transverse member 50 moved to the left. With the adjustments 58 and 59 it is possible to locate the mover support 51 and hence the mover so that it may come in contact with the wheel 30. This makes the support assembly suitable for use on various trailers and with different wheel diameters and widths. The mover support 51 may also be interchanged with different sized variants to cater for differing wheel geometries.

Figure 4:
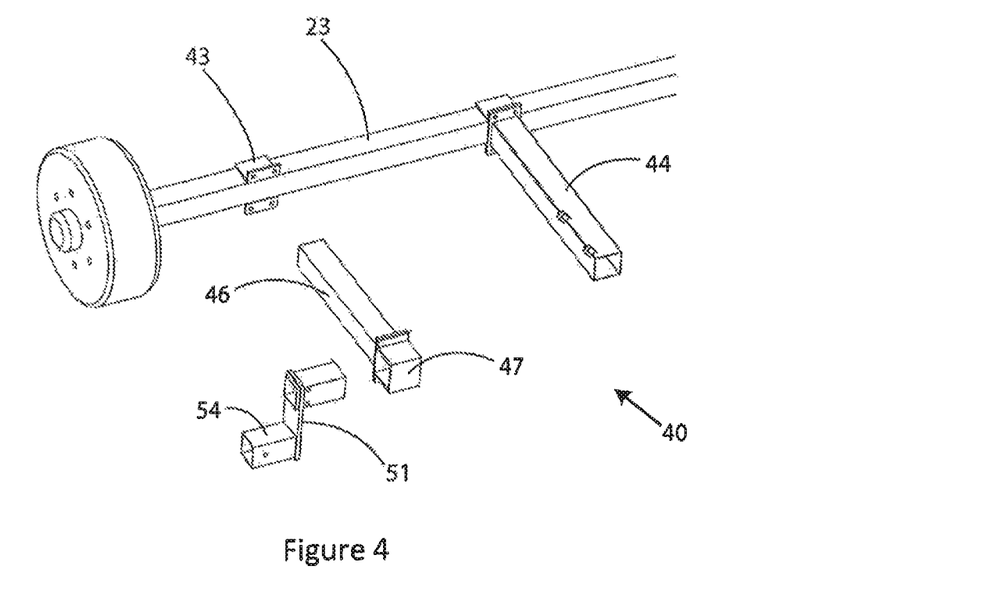
FIG. 4 provides a further view of the support assembly of the first embodiment with various components removed to allow others to be seen in full.

FIG. 4 provides a further view of the support assembly 40 with various components removed to allow others to be seen in full.

Figure 5:
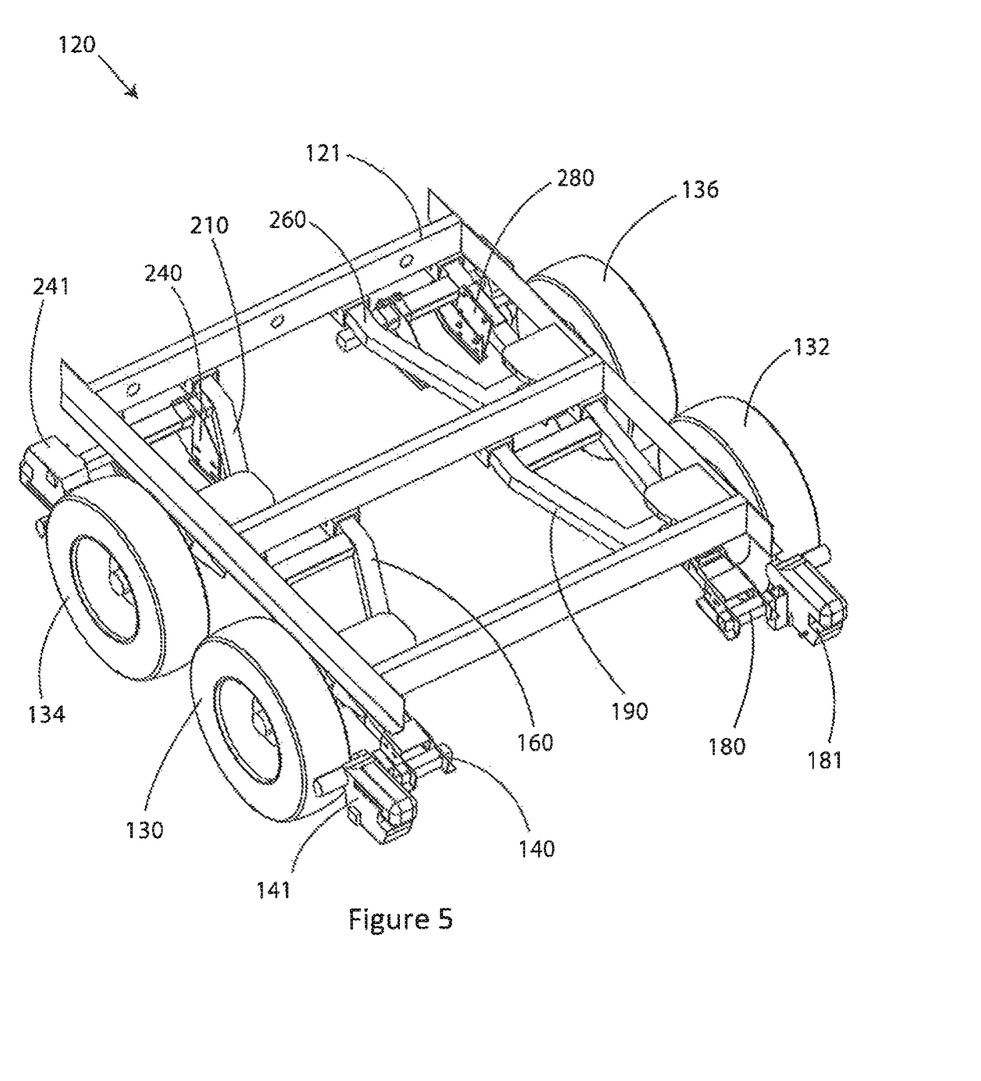
FIG. 5 shows a trailer chassis with independent suspension fitted with trailer mover support assemblies according to a second and third embodiment of the invention.
Figure 6:
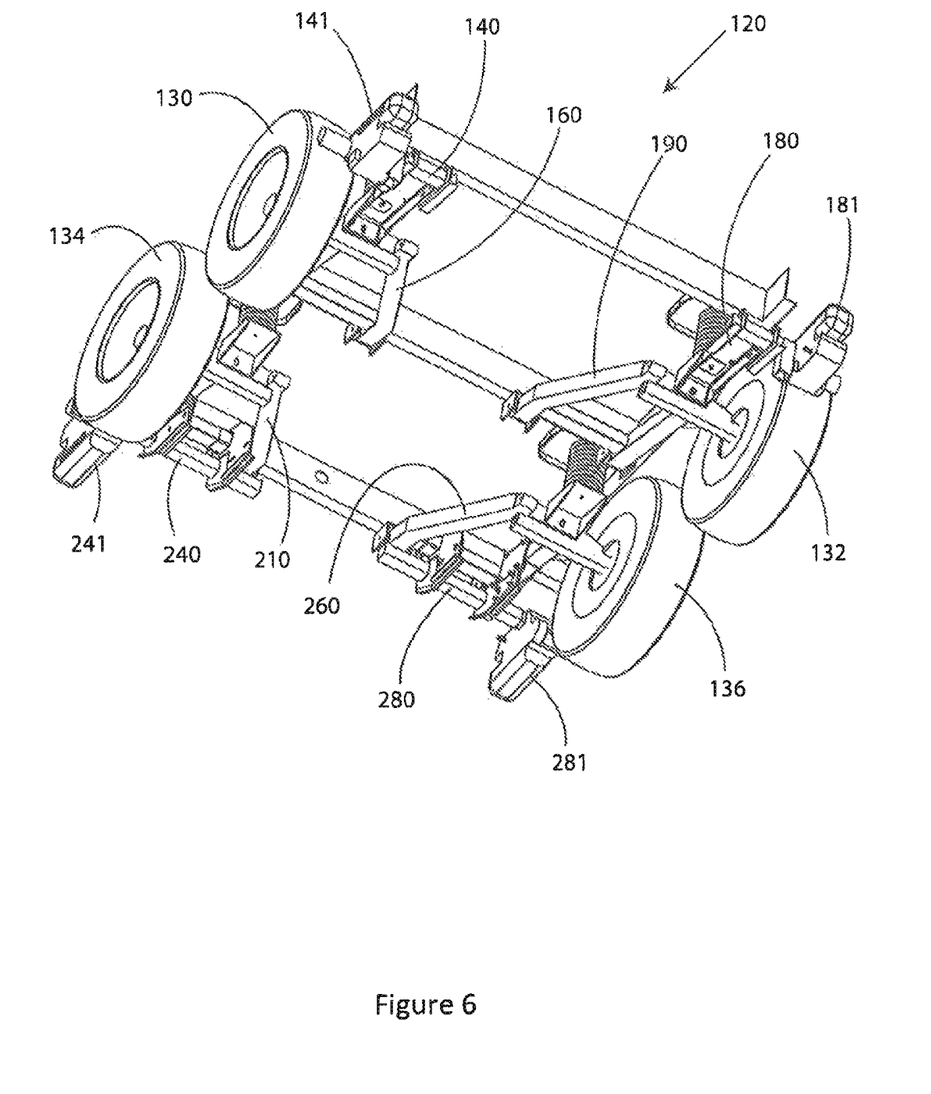
FIG. 6 shows the chassis of FIG. 5 viewed from below.

A trailer chassis with independent suspension 120 is shown in FIG. 5 and includes second and third embodiments of the invention and further mirror image embodiments. The chassis 120 comprises a frame 121 to which are attached independent suspension units 160, 190, 210 and 260. The rear left hand wheel 130 is engaged by trailer mover 141 which is held in position by the support assembly 140 which attaches to the suspension unit 160. Support assembly 180 mounted to suspension unit 190 is a mirror image of assembly 140 and holds mover 181 in position with rear right hand wheel 132. Similarly the front wheels 134 and 136 have associated movers 241 and 281 held by support assemblies 240 and 280 mounted to suspension units 210 and 260. The front right support assembly 240 is a third embodiment of the invention and support assembly 280 is its mirror image. FIG. 6 provides a view of the chassis 120 from below allowing further features of the support assemblies to be discerned.

Figure 7:
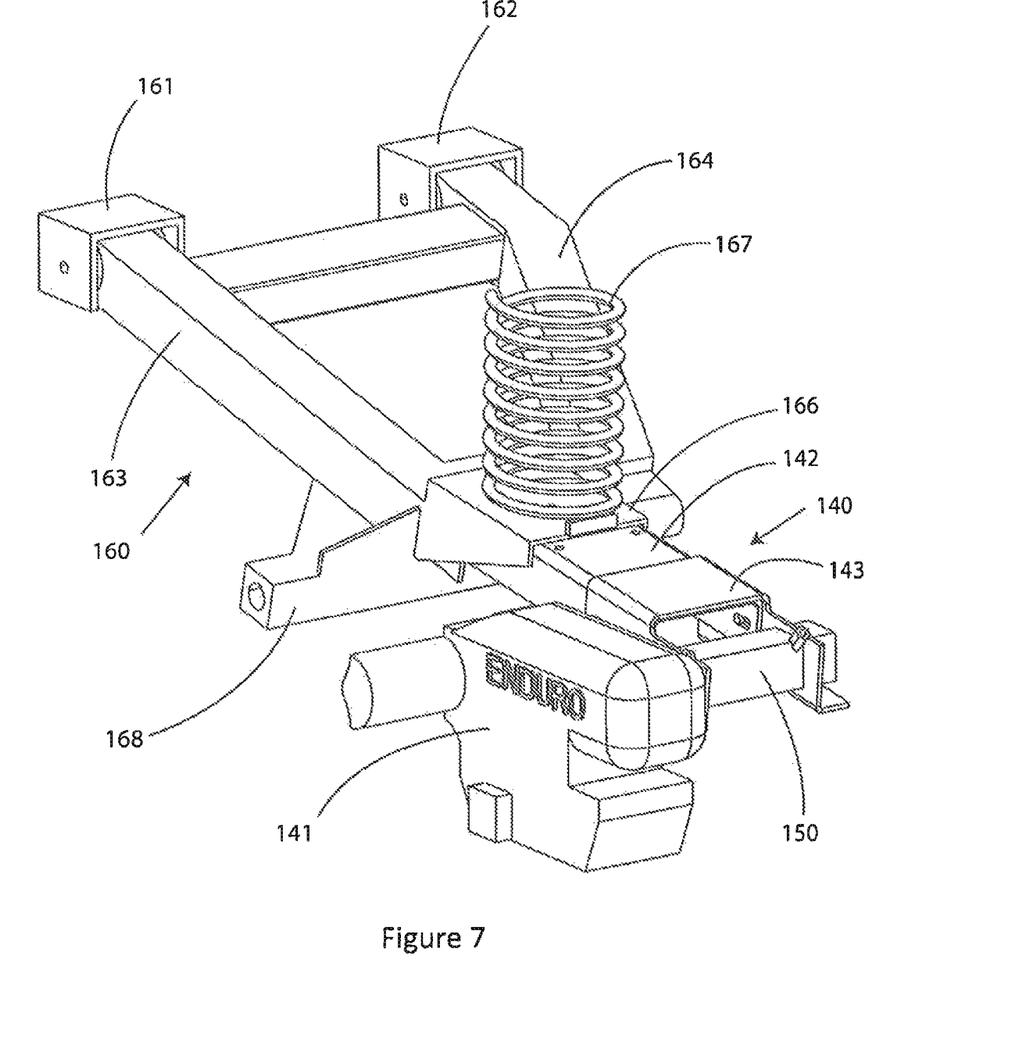
FIG. 7 shows a first isolated view of the rear left trailer mover support assembly according to a second embodiment of the invention fitted to a suspension unit.
Figure 8A:
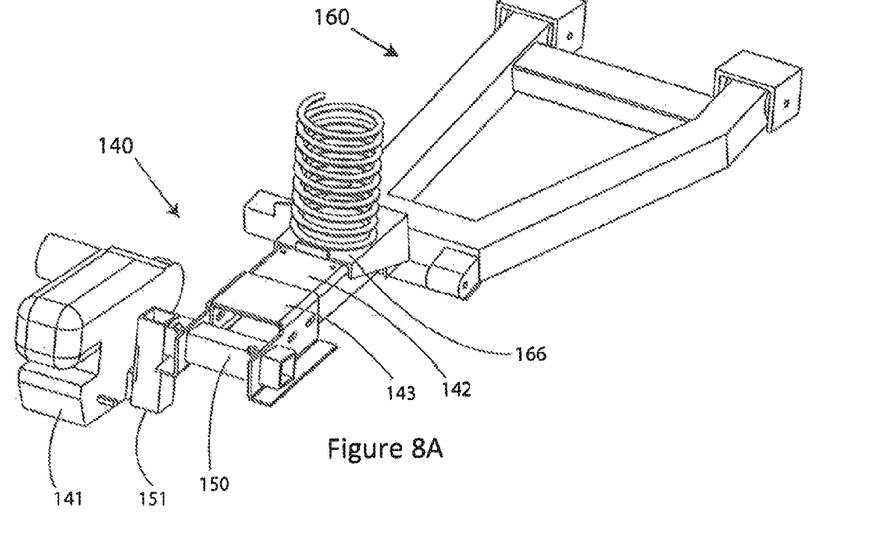
FIG. 8A provides a second view point of FIG. 7 with the trailer mover support assembly in a first position.
Figure 8B:
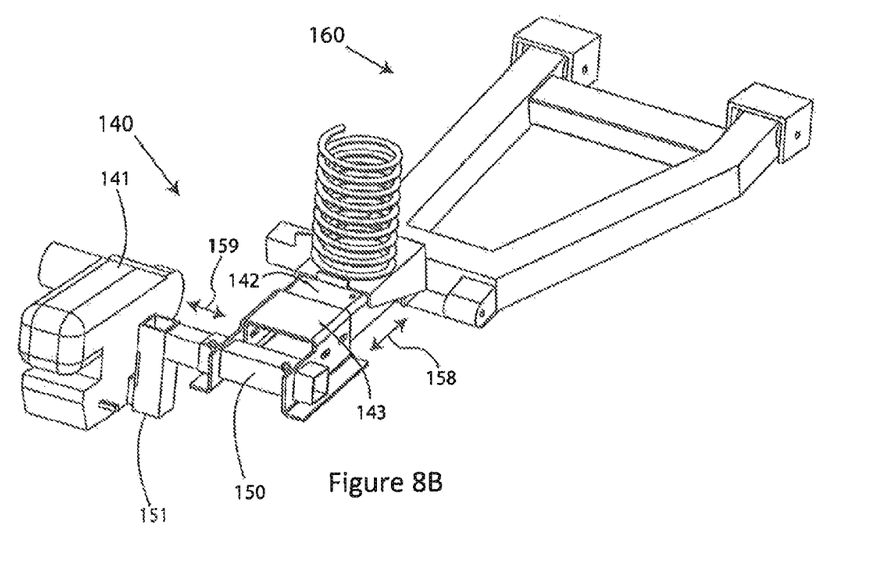
FIG. 8B shows the trailer mover support assembly of FIG. 8A adjusted to a second position.

FIG. 7 provides a first isolated view of the rear left support assembly 140 fitted to the suspension unit 160 shown from a first side. Similar views from a second side are seen in FIGS. 8A and 8B. The suspension unit 160 comprises arms 163 and 164 attached at a first end of the chassis via pivot mounts 161 and 162. The free end of the arms hold axle support 168 and spring 167 on spring support 166. A fixed longitudinal bracket 142 of the support assembly 140 is attached to the spring support 166 by fasteners (not shown). A sliding longitudinal bracket 143 telescopically engages the fixed longitudinal bracket and provides longitudinal adjustment to the support assembly as indicated by arrow 158. The sliding bracket supports transverse guide 150 which telescopically engages mover support bracket 151 to provide transverse adjustment as indicated by arrow 159. FIG. 8B shows the mover support bracket displaced relative to the FIG. 8B, thus providing positional adjustment of the trailer mover 141.

Figure 9:
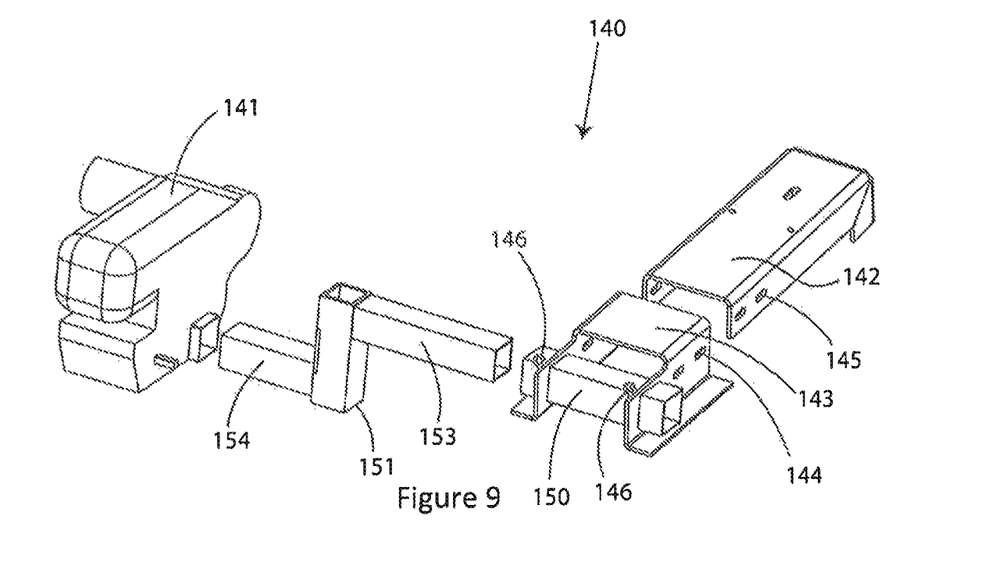
FIG. 9 shows an exploded view of the rear left trailer mover support assembly of FIG. 7 in isolation.

An exploded view of the support assembly 140 is shown in FIG. 9 in which further details can be discerned, including mover attachment 154 for mounting the trailer mover 141; longitudinal adjustment slots 144 and 145 which allow movement of the sliding bracket 144 with respect to the fixed bracket 142; and, transverse locks 146 for locking the mover support to the transverse guide 150.

Figure 10:
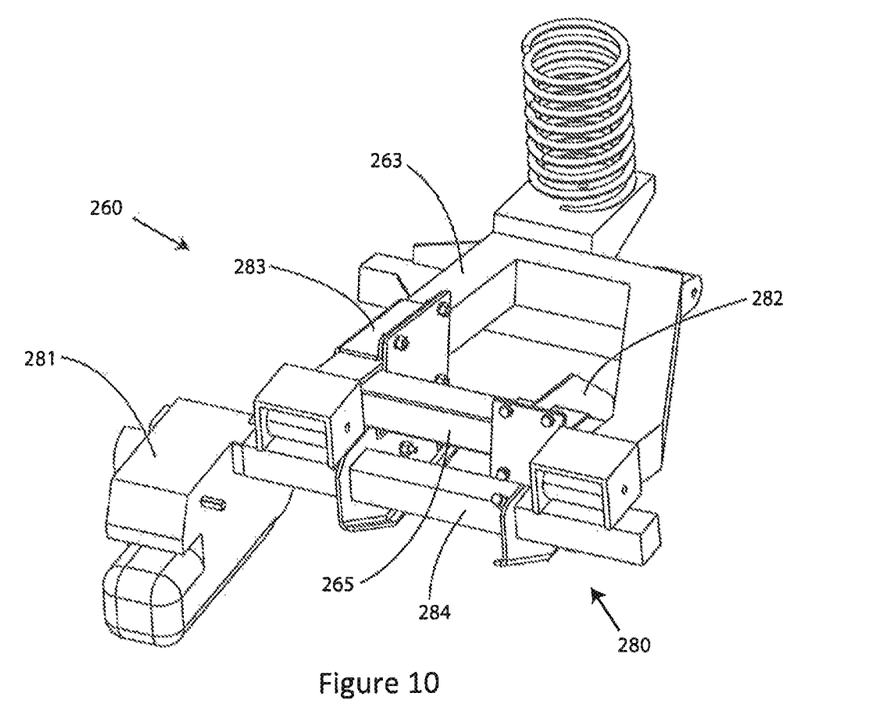
FIG. 10 shows a front right trailer mover support assembly according to a third embodiment of the invention fitted to a suspension unit seen from a first viewpoint.
Figure 11:
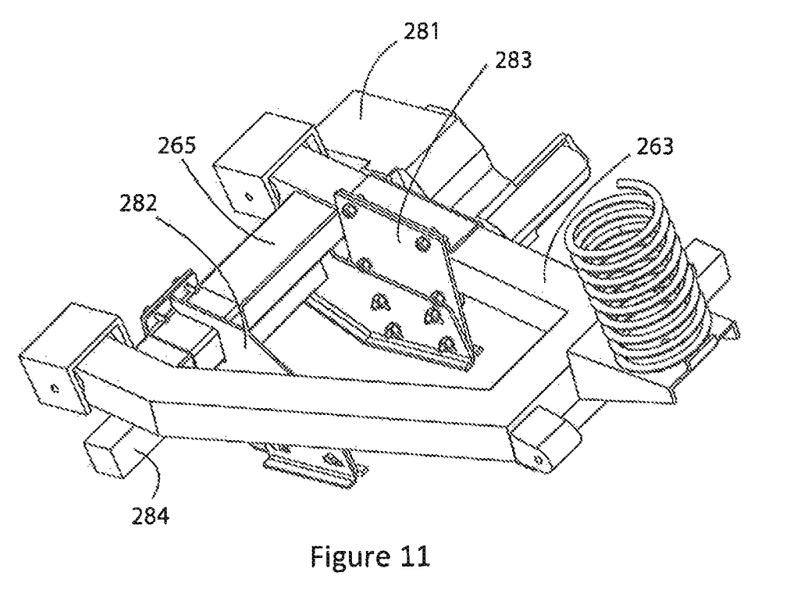
FIG. 11 shows the support assembly of FIG. 10 from a second viewpoint.
Figure 12:
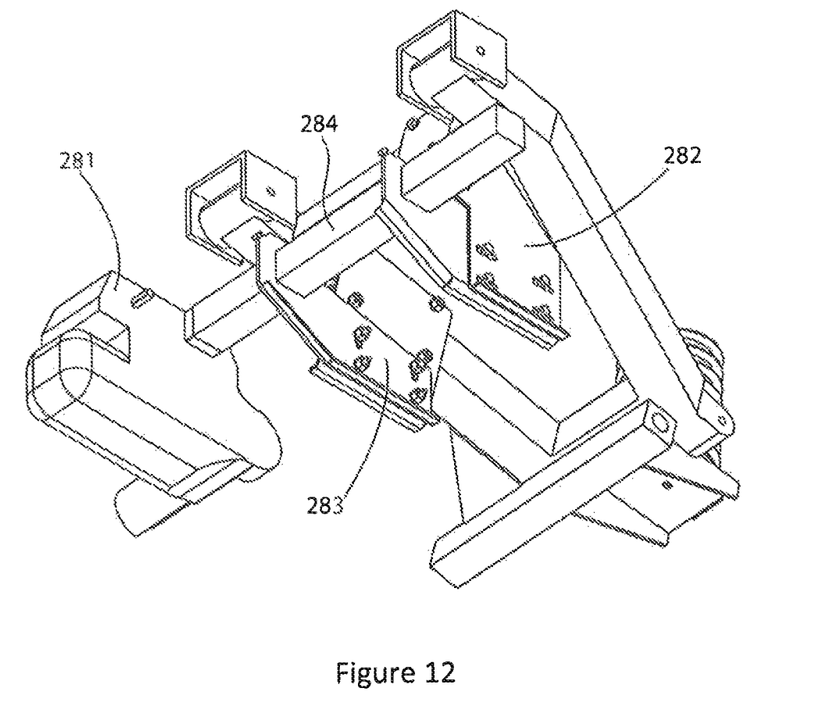
FIG. 12 shows the support assembly of FIG. 10 from a third view point.

A front right support assembly 280 can be seen from various perspectives in FIGS. 10 to 12. The support assembly 280 attaches to the suspension unit 260 differently to the how the support assembly 140 attaches to the suspension unit 160 as the trailer mover 281 sits fore of the wheel 136 (as opposed to the trailer mover 141 which sits behind the wheel 130). The support assembly 280 attaches to the suspension unit 260 via tow brackets, outer mounting bracket 283 which attaches to the outer suspension arm 263 and inner mounting bracket 282 which attaches to the cross member 265 of the suspension unit. The brackets 282 and 283 in turn slidably support mover support 284 on which the trailer mover 281 is mounted.

Figure 13:
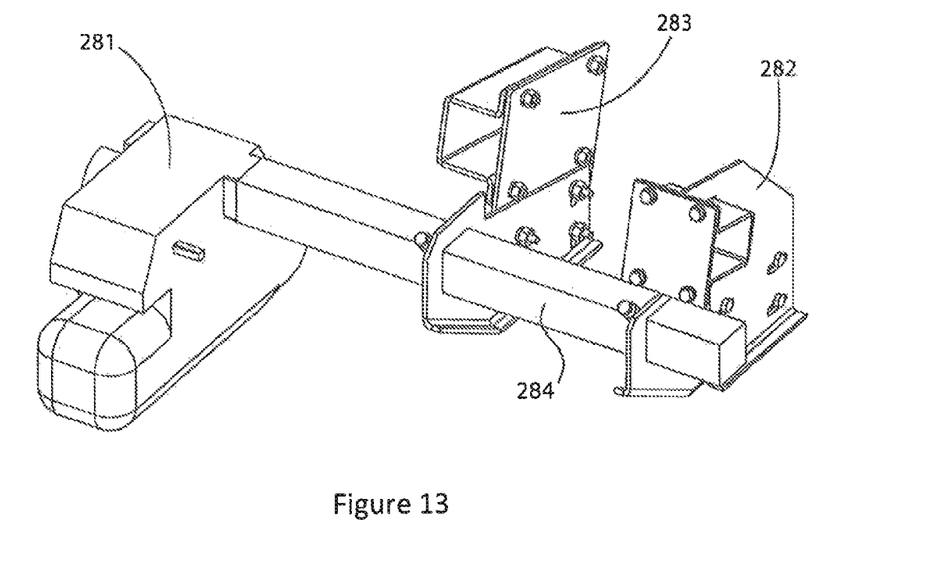
FIG. 13 is an isolated view of the trailer mover support assembly of FIG. 10 in a first position.
Figure 14:
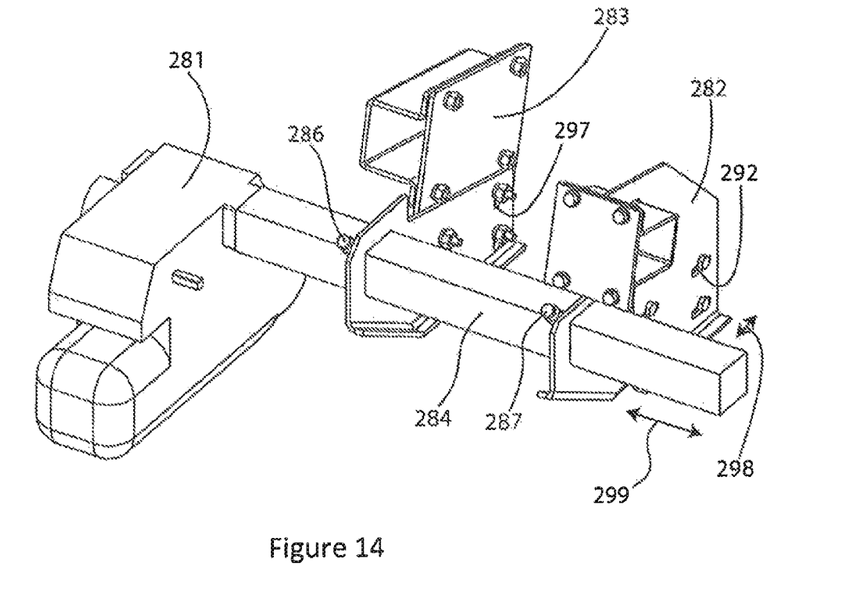
FIG. 14 shows the trailer mover support assembly of FIG. 13 adjusted to a second position.
Figure 15:
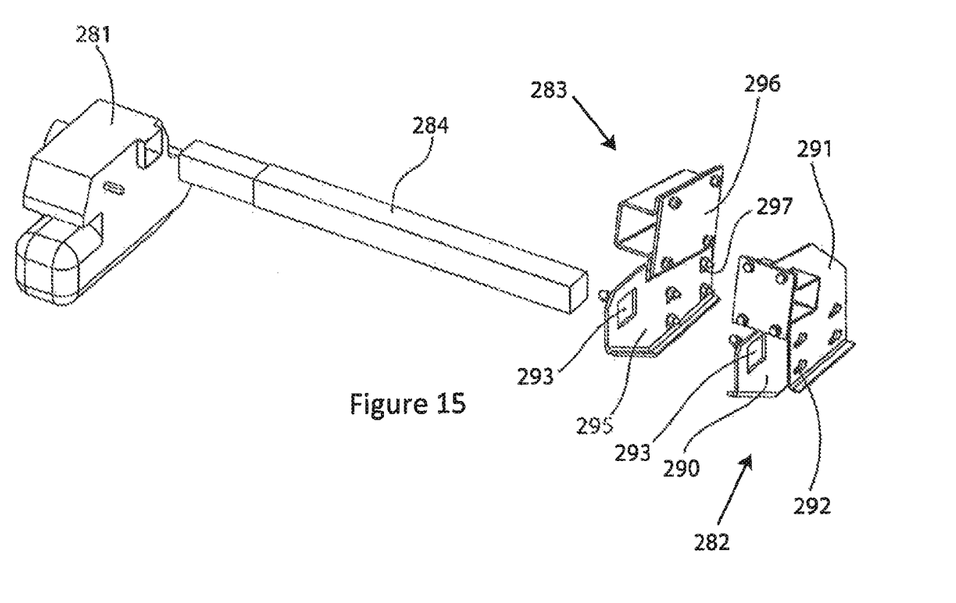
FIG. 15 shows an exploded view of the third embodiment of the trailer mover support assembly.

Further details of the front right support assembly 280 can be seen in FIGS. 13 to 15 in which the support assembly is seen in isolation from the suspension unit. The brackets 282 and 283 are each made from three components pieces held together with nuts and bolts. Bracket 291 includes elongate adjustment slots 292 in adjacent components to provide longitudinal adjustment 298. Bracket 283 includes elongate slots 297 that allow vertical adjustment of the component parts with respect to each other which in turn allows the bracket 283 to move along the outer suspension arm 263 resulting in longitudinal adjustment 298. Lateral adjustment of the trailer mover 181 is provided by mover support slots 293 in the brackets. The mover support is held in the desired position by transverse locks 286 and 287.

The embodiments described above all allow for adjustment of the support assembly to cater for various wheel and suspension geometries. The invention further includes embodiments without these adjustments (not shown) to cater for specific trailer geometries. The choice of whether to produce adjustable or non-adjustable embodiments is an economic decision dictated by the number of trailers of a specific geometry to be fitted with trailer movers.

The reader will now appreciate the present invention which provides a means of supporting a trailer mover in a fixed relationship to the wheels of a trailer with embodiments handling both independent and non-independent suspension; movers mounted either before or aft the wheels; and, movers mounted on either left hand or right hand wheels. Adjustable components provide longitudinal and lateral adjustment of the position of the trailer mover to allow for different wheel and suspension geometries.

Further advantages and improvements may very well be made to the present invention without deviating from its scope. Although the invention has been shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

In one aspect of the present invention, a support assembly includes a support member connected to a sprung component of a trailer; and a trailer mover attached to said support member, wherein said trailer mover is operable to selectively engage with a proximal wheel of the trailer in a fixed spatial relationship, whereby the sprung component resiliently supports a chassis of the trailer via at least one suspension spring.

In another aspect of the present invention, the support member further includes a first member, wherein the first member is connected to the sprung component, and wherein the first member is adapted to provide longitudinal displacement of the trailer mover relative to the wheel; and a second member, wherein the second member is attached to the trailer mover, and wherein the second member is adapted to provide lateral displacement of the trailer mover relative to the wheel. The first member may be adjustable to vary the longitudinal displacement of the trailer mover relative to the wheel, wherein the second member may be adjustable to vary the lateral displacement of the trailer mover relative to the wheel, wherein the sprung component may include an axle supporting the wheel of the trailer, wherein the sprung component may include a spring support plate of an independent suspension unit associated with the wheel of the trailer, and wherein the sprung component comprises a frame of an independent suspension unit associated with the wheel of the trailer.

What is claimed is:

1. A support assembly, comprising:
   a support member connected to a sprung component of a trailer;
   a trailer mover attached to said support member, wherein said trailer mover selectively engages with a proximal wheel of the trailer in a fixed spatial relationship;
   a first member, wherein the first member is connected to the sprung component, and wherein the first member is adapted to provide longitudinal displacement of the trailer mover relative to the wheel; and
   a second member, wherein the second member is attached to the trailer mover, and wherein the second member is adapted to provide lateral displacement of the trailer mover relative to the wheel,
   whereby the sprung component resiliently supports a chassis of the trailer via at least one suspension spring.

2. The support assembly of claim 1, wherein the first member is adjustable to vary the longitudinal displacement of the trailer mover relative to the wheel.

3. The support assembly of claim 1, wherein the second member is adjustable to vary the lateral displacement of the trailer mover relative to the wheel.

4. The support assembly of claim 1, wherein the sprung component comprises an axle supporting the wheel of the trailer.

5. The support assembly of claim 1, wherein the sprung component comprises an axle supporting the wheel of the trailer.

6. The support assembly of claim 2, wherein the sprung component comprises an axle supporting the wheel of the trailer.

7. The support assembly of claim 3, wherein the sprung component comprises an axle supporting the wheel of the trailer.

8. The support assembly of claim 1, wherein the sprung component comprises a spring support plate of an independent suspension unit associated with the wheel of the trailer.

9. The support assembly of claim 1, wherein the sprung component comprises a spring support plate of an independent suspension unit associated with the wheel of the trailer.

10. The support assembly of claim 2, wherein the sprung component comprises a spring support plate of an independent suspension unit associated with the wheel of the trailer.

11. The support assembly of claim 3, wherein the sprung component comprises a spring support plate of an independent suspension unit associated with the wheel of the trailer.

12. The support assembly of claim 1, wherein the sprung component comprises a frame of an independent suspension unit associated with the wheel of the trailer.

13. The support assembly of claim 1, wherein the sprung component comprises a frame of an independent suspension unit associated with the wheel of the trailer.

14. The support assembly of claim 2, wherein the sprung component comprises a frame of an independent suspension unit associated with the wheel of the trailer.

15. The support assembly of claim 3, wherein the sprung component comprises a frame of an independent suspension unit associated with the wheel of the trailer.

* * * * *